(12) United States Patent
Smith et al.

(10) Patent No.: US 10,543,891 B2
(45) Date of Patent: Jan. 28, 2020

(54) AUTONOMOUS UNDERWATER VEHICLE

(71) Applicant: Autonomous Robotics Limited, Warminster, Wiltshire (GB)

(72) Inventors: Craig Paul Smith, Warminster (GB); Arran James Holloway, Warminster (GB)

(73) Assignee: Autonomous Robotics Limited, Warminster, Wiltshire (GB)

( * ) Notice: Subject to any disclaimer, the term of this patent is extended or adjusted under 35 U.S.C. 154(b) by 104 days.

(21) Appl. No.: 15/750,713

(22) PCT Filed: Aug. 9, 2016

(86) PCT No.: PCT/GB2016/052476
§ 371 (c)(1),
(2) Date: Feb. 6, 2018

(87) PCT Pub. No.: WO2017/025738
PCT Pub. Date: Feb. 16, 2017

(65) Prior Publication Data
US 2018/0346082 A1 Dec. 6, 2018

(30) Foreign Application Priority Data
Aug. 10, 2015 (GB) .................................. 1514063.5

(51) Int. Cl.
*B63G 8/00* (2006.01)
*G05D 1/04* (2006.01)
(Continued)

(52) U.S. Cl.
CPC .............. *B63G 8/001* (2013.01); *B63G 8/22* (2013.01); *G01V 1/184* (2013.01); *G01V 1/3852* (2013.01);
(Continued)

(58) Field of Classification Search
CPC .... B63G 8/001; B63G 8/22; B63G 2008/004; G05D 1/048; G01V 1/184; G01V 1/3852; B63B 2211/02
See application file for complete search history.

(56) References Cited

U.S. PATENT DOCUMENTS

2010/0302901 A1 12/2010 Welker et al.
2012/0137950 A1* 6/2012 Rapp ..................... C25B 1/12
114/331
(Continued)

FOREIGN PATENT DOCUMENTS

WO WO 2013/169115 A1 11/2013
WO WO 2014/096265 A2 6/2014

OTHER PUBLICATIONS

Jan. 11, 2016 UK Search Report for GB 15 14063.5.
(Continued)

*Primary Examiner* — Frederick M Brushaber
(74) *Attorney, Agent, or Firm* — Hahn Loeser & Parks, LLP (57) ABSTRACT

A method of obtaining data with a sensor of an autonomous underwater vehicle (AUV), the AUV comprising a bladder which contains a gas and is exposed to ambient water pressure. A downward thrust force is generated which causes the AUV to descend through a body of water, wherein the bladder contracts as the AUV descends due to an associated increase in the ambient water pressure, the contraction of the bladder causing the gas to compress and the AUV to become negatively buoyant. Next the AUV lands on a bed of the body of water. After the AUV has landed on the bed, the sensor is operated to obtain data with the AUV stationary and negatively buoyant and a weight of the AUV supported by the bed. After the data has been obtained, an upward thrust force is generated which overcomes the negative buoyancy of the AUV and causes the AUV to ascend through the body of water, the ascent of the AUV causing the bladder to expand due to the associated decrease in the ambient water pressure, the expansion of the bladder causing the gas to decompress and the AUV to become neutrally buoyant.

20 Claims, 5 Drawing Sheets

(51) Int. Cl.
*B63G 8/22* (2006.01)
*G01V 1/18* (2006.01)
*G01V 1/38* (2006.01)

(52) U.S. Cl.
CPC .......... *G05D 1/048* (2013.01); *B63B 2211/02* (2013.01); *B63G 2008/004* (2013.01)

(56) References Cited

U.S. PATENT DOCUMENTS

| | | |
|---|---|---|
| 2012/0289103 A1 | 11/2012 | Hudson et al. |
| 2013/0032078 A1* | 2/2013 | Yahnker ................. B63G 8/001 114/331 |
| 2013/0083623 A1 | 4/2013 | Brizard et al. |
| 2013/0228117 A1* | 9/2013 | Edwards ................. B63B 17/00 114/331 |
| 2014/0198610 A1 | 7/2014 | Welker et al. |
| 2015/0003194 A1* | 1/2015 | Brizard ................. G01V 1/166 367/15 |
| 2015/0151819 A1* | 6/2015 | Tjom ..................... B63G 8/001 114/321 |
| 2015/0308212 A1* | 10/2015 | Maunus ................. F15B 1/022 166/368 |
| 2016/0281460 A1* | 9/2016 | Wang ..................... E21B 47/06 |

OTHER PUBLICATIONS

Nov. 18, 2016 Transmittal of International Search Report and Written Opinion of ISR for PCT/GB2016/052476.
Nov. 20, 2017 UK Examination Report for GB 15 14063.5.

* cited by examiner

Fig. 5

AUTONOMOUS UNDERWATER VEHICLE

The present application is a submission under 35 USC § 371 of international application no. PCT/GB2016/052476, filed 9 Aug. 2016 and entitled Autonomous Underwater Vehicle, which was published in the English language with publication no. WO 2017/025738 A1 on 16 Feb. 2017, and which claims the benefit of the filing date of GB 15 14063.5 filed 10 Aug. 2015, the contents of which are hereby incorporated by reference.

FIELD OF THE INVENTION

The present invention relates to a method of obtaining data with a sensor of an autonomous underwater vehicle (AUV), and an AUV for performing such a method.

BACKGROUND OF THE INVENTION

WO2014/096265 described an autonomous underwater vehicle (AUV) for recording seismic signals during a marine seismic survey. The AUV includes a body having a flush shape; a buoyancy system located inside the body and configured to control a buoyancy of the AUV while traveling underwater; a seismic sensor for recording seismic signals; and a processor connected to the buoyancy system and configured to select one of plural phases for the buoyancy system at different times of the seismic survey.

The buoyancy system comprises a chamber, and in a first phase water is introduced into the chamber and air released from the chamber so that the buoyancy of the AUV becomes neutral or slightly negative and the AUV starts its journey towards a target position at the sea bottom. When the AUV reaches the target position, the AUV needs to make a good coupling with the bottom so that the seismic sensor(s) record a high quality seismic signal. To achieve this goal, and also to stabilize the AUV on the sea bottom, more water is introduced into the chamber and air released. In this second phase, the buoyancy of the AUV is made negative, thus increasing the coupling with the sea bottom. In a third phase, compressed gas is introduced into the chamber to displace the water and make the AUV positively buoyant so it detaches from the seabed and floats towards the surface.

A problem with the AUV of WO2014/096265 is that the active buoyancy system and associated processor are complex and expensive. Also, if the AUV is to be operated at extreme depth—for instance at 3000 m—then the compressed gas must be at a very high pressure—for instance 30 MPa. Such a highly pressurised gas presents a safety hazard.

SUMMARY OF THE INVENTION

A first aspect of the invention provides a method of obtaining data with a sensor of an autonomous underwater vehicle (AUV), the AUV comprising a bladder which contains a gas and is exposed to ambient water pressure, the method comprising: generating a downward thrust force which causes the AUV to descend through a body of water, wherein the bladder contracts as the AUV descends due to an associated increase in the ambient water pressure, the contraction of the bladder causing the gas to compress and the AUV to become negatively buoyant; landing the AUV on a bed of the body of water; after the AUV has landed on the bed, operating the sensor to obtain data with the AUV stationary and negatively buoyant and a weight of the AUV supported by the bed; and after the data has been obtained, generating an upward thrust force which overcomes the negative buoyancy of the AUV and causes the AUV to ascend through the body of water, the ascent of the AUV causing the bladder to expand due to the associated decrease in the ambient water pressure, the expansion of the bladder causing the gas to decompress and the AUV to become neutrally buoyant.

After the AUV has ascended through the body of water and become neutrally buoyant, the AUV may stop ascending and remain at a neutrally buoyant depth. Optionally the AUV may then be recovered under the surface of the water at the neutrally buoyant depth. Alternatively, after the AUV has ascended through the body of water and become neutrally buoyant, the AUV may continue ascending and become positively buoyant.

Typically the AUV has a nose and a tail, and the bladder is positioned closer to the nose than to the tail so that the contraction of the bladder generates a nose-down pitching moment which causes the nose of the AUV to pitch down as it descends.

Optionally the bladder is housed within a container, and the method comprises: admitting water into the container via one or more ports as the AUV descends to expose the bladder to ambient water pressure; expelling water from the container via the port(s) as the AUV ascends; and constraining the expansion of the bladder with the container. Alternatively the expansion of the bladder may be constrained by elements within the bladder.

Typically the expansion of the bladder is constrained by the container, or the elements within the bladder, to limit the buoyancy of the AUV.

The upward thrust force and the downward thrust force are typically generated by a propulsion system of the AUV, rather than by changing a mass of gas in the bladder. The upward thrust force and the downward thrust force may be generated by creating a stream of water directed away from the AUV with the propulsion system of the AUV. For instance the propulsion system may comprise one or more propellers or pump jets.

Optionally the sensor is a seismic sensor which is operated to obtain seismic data from the bed of the body of water. In this case the negative buoyancy of the AUV during data acquisition is beneficial for two reasons: firstly it ensures that the AUV is stable and not disturbed by currents, and secondly it couples the AUV strongly to the bed and ensures that the seismic data is acquired accurately. However the present invention is not limited to seismic surveying, so the sensor may alternatively be an electromagnetic sensor for determining electromagnetic properties of geological structures beneath the bed, a hydrophone for sensing objects in the body of water above the stationary sensor, or a sensor for measuring environmental parameters such as water current, temperature or salinity.

Preferably the AUV lands on the bed of the body of water at a depth greater than 1000 m or greater than 2000 m.

A further aspect of the invention provides an autonomous underwater vehicle (AUV) comprising a sensor for obtaining data; a propulsion system for generating a thrust force to propel the AUV through the water; and a bladder which contains a gas and is exposed to ambient water pressure when the AUV is submerged, wherein the bladder is arranged to contract as the AUV descends due to an associated increase in the ambient water pressure, the contraction of the bladder causing the gas to compress and the AUV to become negatively buoyant, and wherein the bladder is arranged to expand as the AUV ascends due to an associated decrease in the ambient water pressure, the expansion of the bladder causing the gas to decompress and the AUV to become neutrally buoyant.

Optionally the sensor is a seismic sensor such as a geophone or accelerometer.

The gas in the bladder has a pressure at sea level such that the AUV has a neutral buoyancy at a desired depth.

The gas may be at an elevated pressure at sea level which is greater than 150 kPa, and preferably greater than 200 kPa. The gas may be at an elevated pressure at sea level which is greater than 150 kPa but less than 1 Mpa. Most typically gas is at an elevated pressure at sea level which is greater than 150 kPa but less than 500 kPa.

The gas may have a pressure at sea level such that the AUV has a neutral buoyancy at a depth in water which is greater than 5 m, typically greater than 10 m and most preferably greater than 20 m. Optionally the gas has a pressure at sea level such that the AUV has a neutral buoyancy at a depth in water which is less than 50 m, typically less than 40 m and most preferably less than 30 m. In a preferred embodiment the gas has a pressure at sea level such that the AUV has a neutral buoyancy at a depth in water between 20 m and 30 m.

Typically the bladder is arranged so that a mass of the gas in the bladder does not change as the bladder contracts.

Typically the bladder contains a fixed mass of gas.

Optionally the AUV has a nose and a tail, and the bladder is positioned closer to the nose than to the tail so that the contraction of the bladder generates a nose-down pitching moment which causes the nose of the AUV to pitch down as it descends.

The bladder may be housed within a container which limits a volume of the bladder and has one or more ports which enable(s) water to flow into the container to expose the bladder to ambient water pressure when the AUV is submerged.

Optionally the bladder has a valve which enables the gas to be introduced into the bladder. Typically the valve can open to admit gas into the bladder and close to prevent gas from being released from the bladder.

Optionally the propulsion system is arranged to generate the thrust force by creating a stream of water directed away from the AUV.

Typically the AUV does not include a source of compressed gas for filling the bladder.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
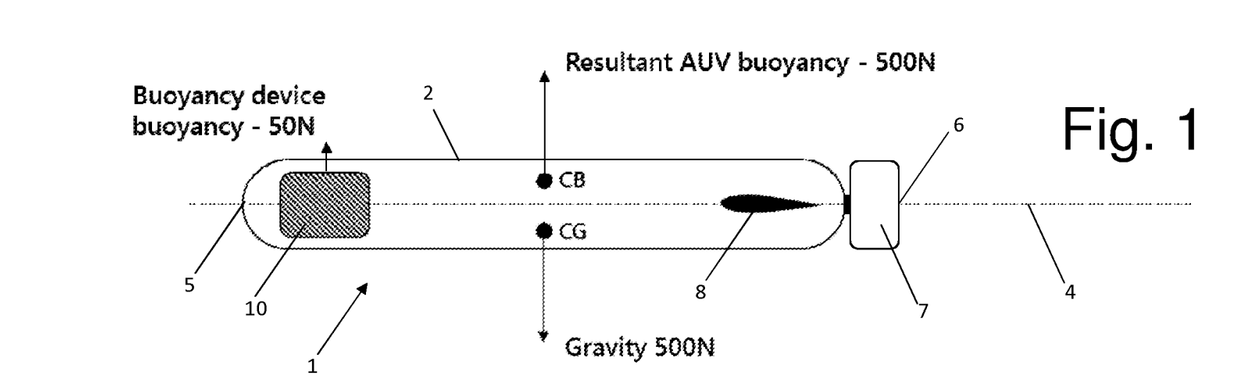
FIG. 1 shows an AUV at a depth of neutral buoyancy.
Figure 7:
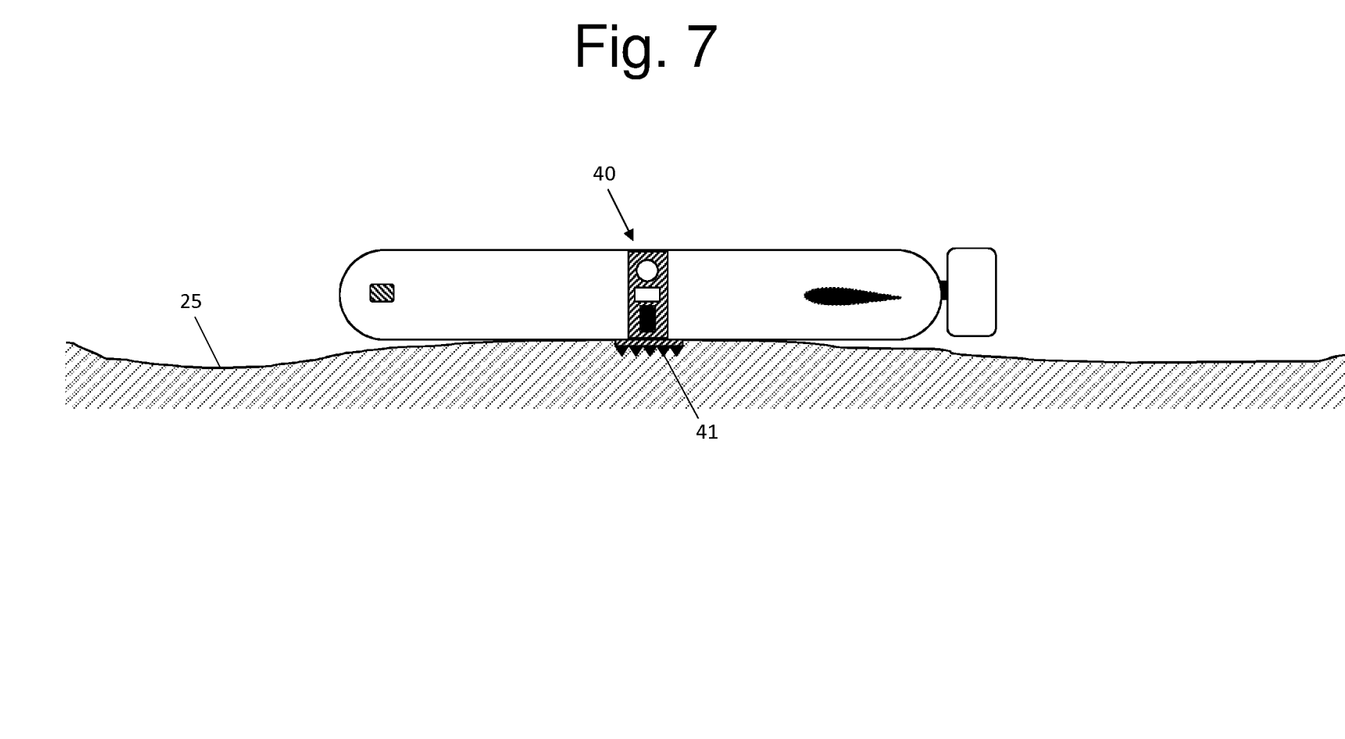
FIG. 7 shows the seismic sensor system of the AUV.

An autonomous underwater vehicle (AUV) 1 shown in FIG. 1 comprises a body 2 containing a seismic sensor system (not shown). The seismic sensor system is shown in FIG. 7 which will be discussed below. The body 2 has an axis 4 which passes through a nose 5 and a tail 6 of the AUV. The AUV has a propulsion system 7 which consists of a single propeller at the tail which can be operated to create a stream of water directed away from the AUV along the axis 4. The stream of water generates a thrust force along the axis 4 to propel the AUV through the water.

Figure 3:
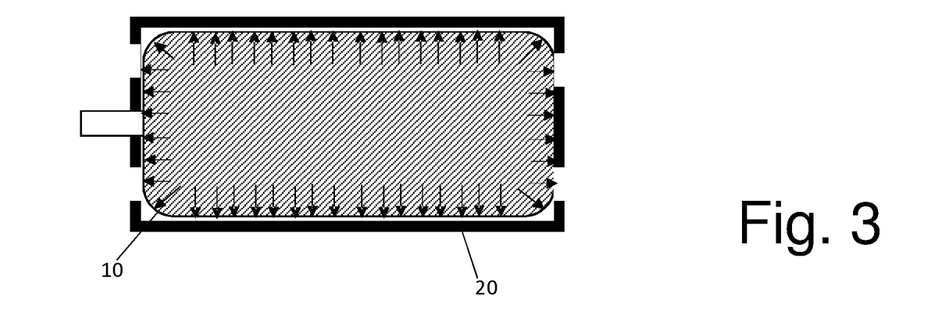
FIG. 3 shows the bladder in an expanded state.
Figure 4:
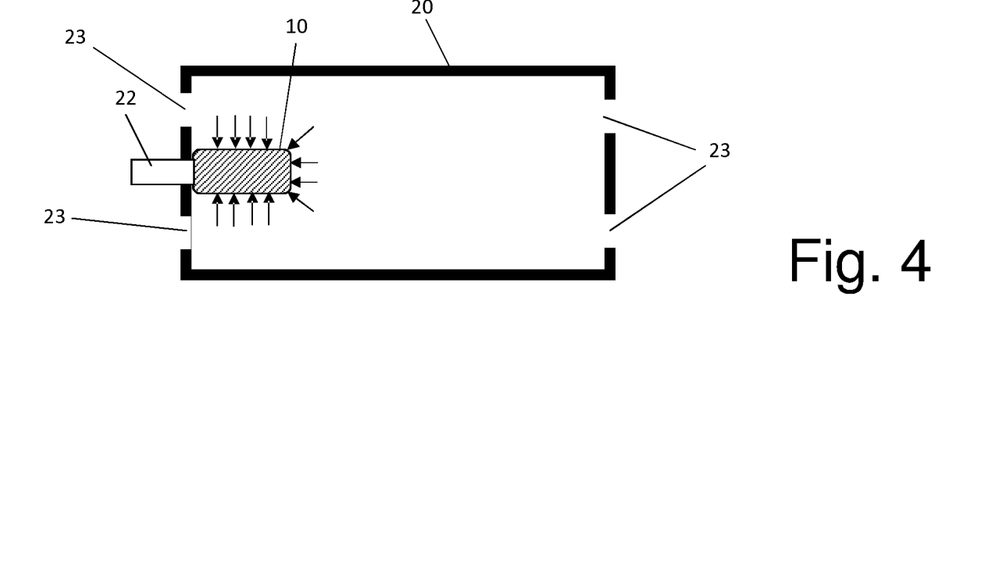
FIG. 4 shows the bladder in a contracted state.

A bladder 10 is housed in the body 2 within a container 20 shown in FIGS. 3 and 4. The bladder 10 is filled with air at a desired initial sea-level pressure via a valve 22. The container has water inlet ports 23 which enable water to flow into the container to expose the bladder 10 to ambient water pressure when the AUV is submerged.

The bladder 10 provides a passive buoyancy control system. As the AUV descends, the associated increase in ambient water pressure causes the bladder 10 to contract, which in turn causes the air in the bladder to compress so that the air pressure remains equal to the ambient water pressure. The initial pressure of the air is tuned so that the AUV is positively buoyant on the surface but becomes neutrally buoyant at a desired depth.

Figure 5:
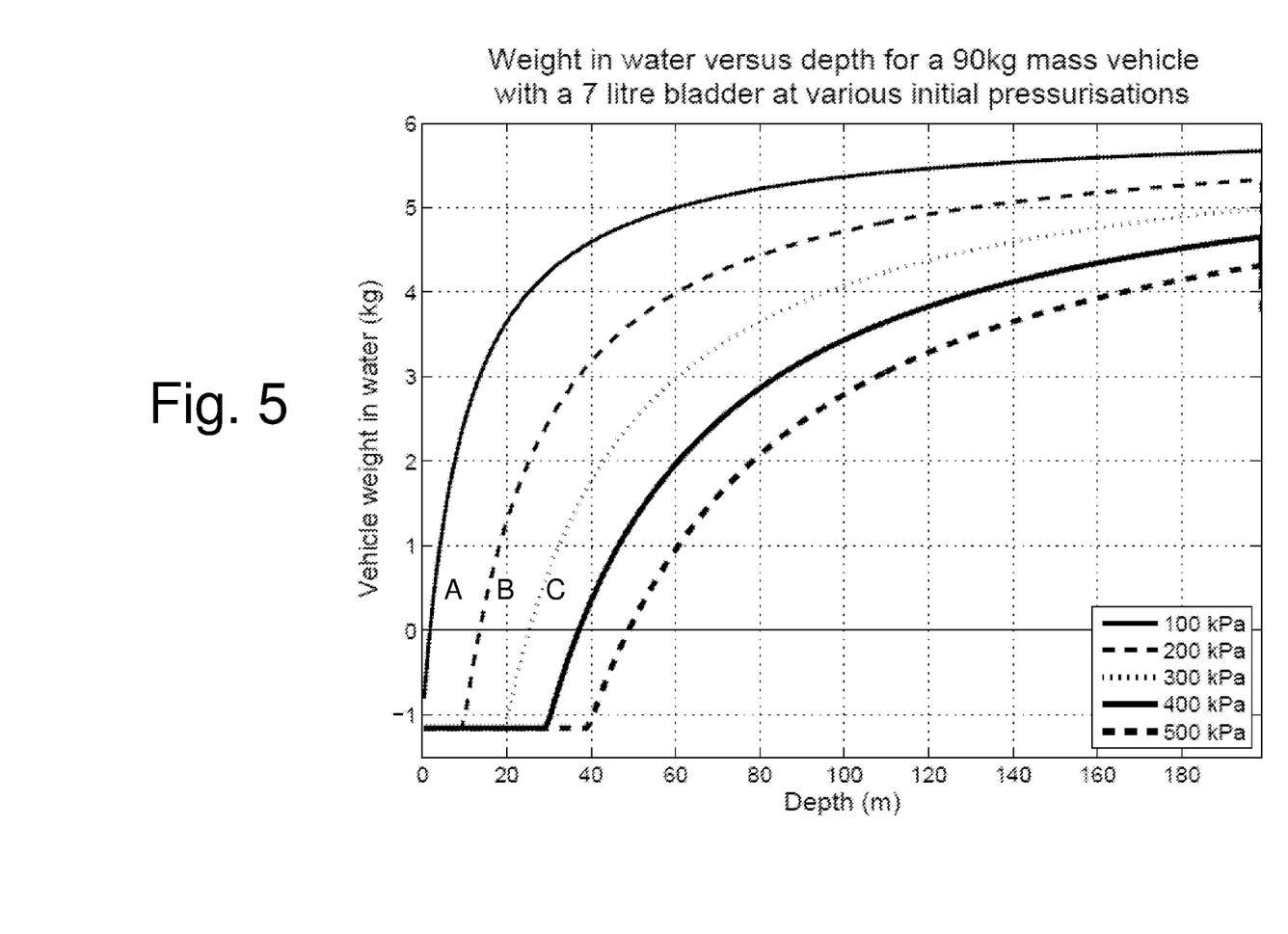
FIG. 5 is a graph of weight in water versus depth for various initial pressurisations.

FIG. 5 is a graph showing the weight in water of the AUV, which in this example has a mass of 90 kg excluding the weight of water in the container 20 and a 7 litre bladder. If the bladder 10 is pressurised to 100 kPa then the AUV is positively buoyant at the surface but quickly becomes negatively buoyant at a relatively shallow depth A of about 2 m. If the bladder 10 is filled with air to a higher pressure of 200 kPa then the AUV is positively buoyant at the surface with a weight in water just under −1 kg. The weight in water remains the same until the depth reaches about 10 m at which point the ambient water pressure exceeds 200 kPA, the bladder starts to contract, the AUV become less buoyant, and then it becomes neutrally buoyant at a depth B of about 13 m. If the bladder 10 is filled with air to a higher pressure of 300 kPa then the AUV is positively buoyant at the surface with a weight in water just under −1 kg. The container 20 limits the volume of the bladder 10 so that the weight in water on the surface is the same (just under −1 kg) regardless of whether the initial pressure is 200 kPa, 300 kPA or higher. The weight in water remains the same until the depth reaches about 20 m at which point the bladder starts to contract, the AUV becomes less buoyant until it becomes neutrally buoyant at a depth C of about 25 m. Thus it can be seen that the depth of neutral buoyancy can be chosen by choosing an appropriate initial pressure.

FIG. 1 shows the AUV at a neutrally buoyant depth. The air-filled bladder 10 generates an upward buoyancy force of 50 N. The weight of the AUV generates a downward weight force of 500 N centred on a centre of gravity CG. The total buoyancy forces acting on the AUV are 500 N, centred on a centre of buoyancy CB. These buoyancy forces come partly from the 50 N generated by the bladder, and partly from other positively buoyant elements (not shown) of the AUV. The centre of gravity CB is directly above the centre of buoyancy CG and the axis 4 is horizontal.

Figure 2:
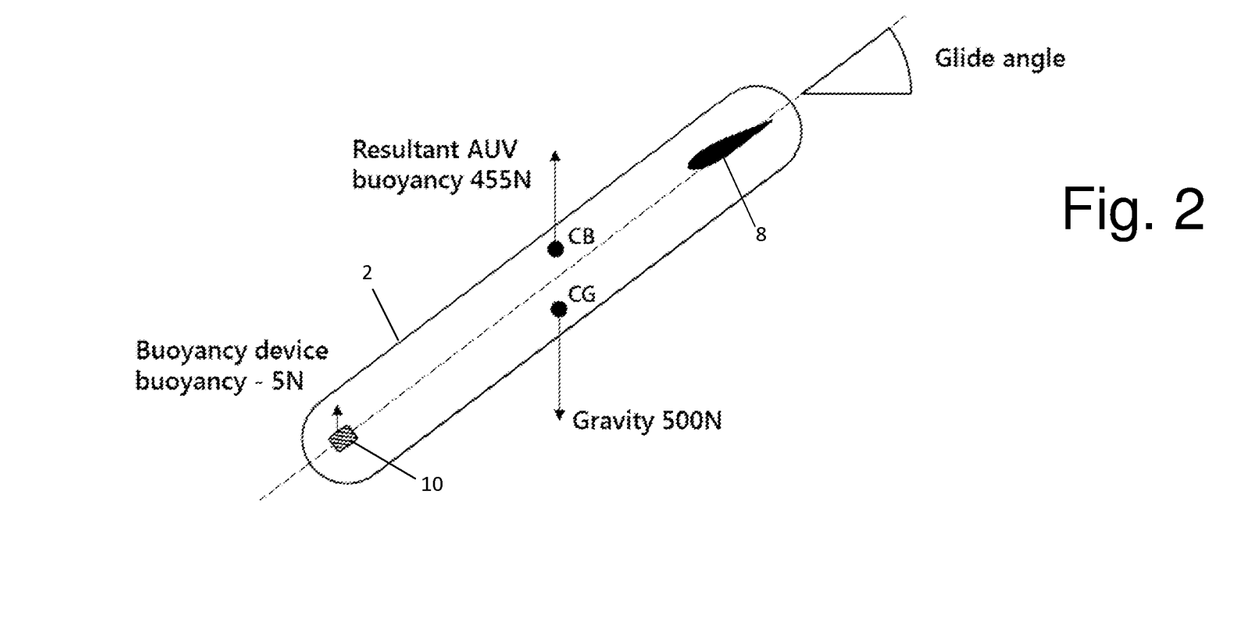
FIG. 2 shows the AUV nose down and at a depth of negative buoyancy.

As the AUV descends, the bladder 10 contracts, and water at ambient pressure enters the container 20 via the water inlet ports 23 so the volume of water displaced by the AUV reduces. By Archimedes' principal the upward buoyancy force generated by the bladder 10 reduces to 5 N as shown in FIG. 2. The bladder is positioned closer to the nose 5 than to the tail 6, so the contraction of the bladder generates a nose-down pitching moment which causes the nose of the AUV to pitch down as shown in FIG. 2 to keep the centre of gravity CB directly above the centre of buoyance CG. The glide angle shown in FIG. 2 increases as the buoyancy of the AUV decreases.

Figure 6:
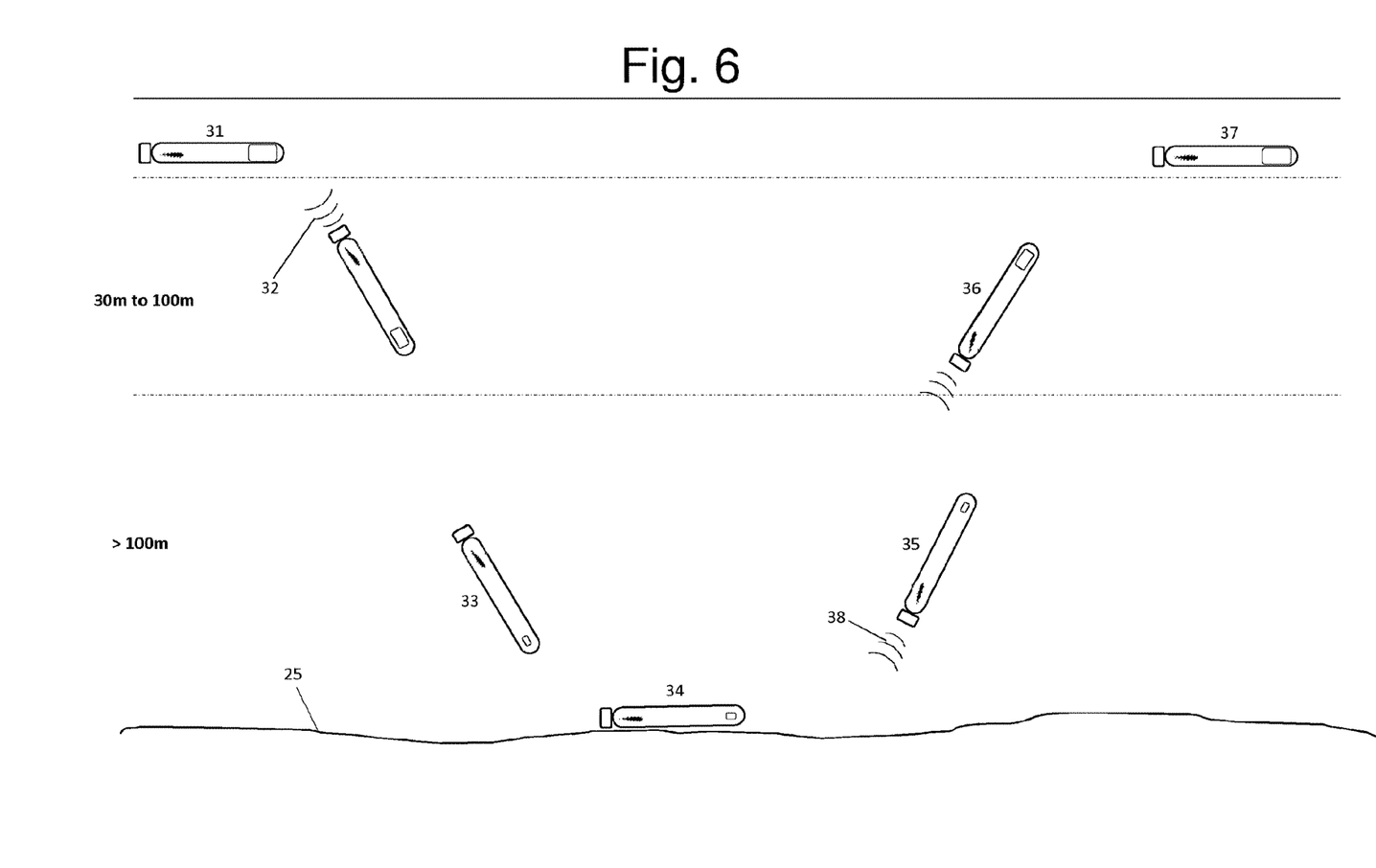
FIG. 6 shows a series of phases during a survey of the seabed.

FIG. 6 shows a method of obtaining seismic data from a seabed 25 with the AUV 1. First the AUV is deployed to a location 31 where it is neutrally buoyant—for example with an initial pressure of 300 kPa giving a neutral buoyancy depth of about 25 m. A variety of deployed methods may be employed. For example the AUV can be deployed from a surface vessel by carrying it down through a tube with a conveyor. The tube has an outlet at the neutrally buoyant depth and the AUV is ejected from the outlet.

Next the propeller 7 is energised to generate a thrust force which initially causes the AUV to move horizontally. The AUV has a control surface 8 which generates a hydrodynamic nose-down pitching moment which drives the nose down. The thrust force is now a downward thrust force 32 so the AUV is propelled down through the body of water in a powered descent phase. As the AUV descends, the bladder contracts due to the associated increase in ambient water pressure, and the contraction of the bladder causes the gas to compress, water to flow into the container and the AUV to become negatively buoyant. The contraction of the bladder also generates a nose-down pitching moment as described above. The propeller remains on during the powered descent phase until a depth of about 100 m is reached. At 100 m the weight in water has reached about 4 kg and the propeller is turned off. The AUV then sinks to the seabed 25 under its own weight as indicated at 33 during an unpowered descent phase. The seabed 25 m is typically at a depth of the order of 3000 m.

As the AUV approaches the seabed at the end of the unpowered descent phase, the control surfaces 8 are adjusted so that the nose lifts and the AUV lands on the seabed as indicated at 34. After the AUV has landed on the seabed, a seismic sensor system is operated in a data acquisition phase to obtain seismic data from the bed with the AUV stationary and negatively buoyant and a weight of the AUV supported by the bed. The negative buoyancy of the AUV anchors it to the seabed and prevents it from being moved during the data acquisition phase by ocean currents or other disturbances. The negative buoyancy of the AUV also ensures that the AUV is strongly coupled to the seabed so that seismic vibrations from the seabed are accurately picked up by the sensor system. The seismic data is stored on-board the AUV.

The seismic sensor system is shown in FIG. 7. A set of three orthogonally oriented geophones or accelerometers 40 are housed inside the body 2 of the AUV. A set of spikes 41 are mounted on the exterior of the body 2 and are pushed into the seabed 25 by the weight of the AUV. A surface vessel (not shown) generates a seismic pulse which is directed into the seabed and then reflected by geological structures beneath the seabed. The reflected seismic energy is sensed by an array of AUVs stationed on the seabed including the AUV 1 shown in FIG. 7. The spikes 41 guide the seismic energy towards the geophones or accelerometers 40 which generate seismic data for storage on the AUV.

After the seismic data has been obtained, the propeller is turned on to generate a thrust force which is initially horizontal, but after an initial horizontal period of motion the control surfaces 8 generate a hydrodynamic nose-up pitching moment which drives the nose of the AUV up. The thrust force is now an upward thrust force 38 so that it overcomes the negative buoyancy of the AUV and causes the AUV to ascend through the body of water as indicated at 35 and 36 during an ascent phase. The ascent of the AUV causes the bladder to expand due to the associated decrease in ambient water pressure, the expansion of the bladder causing the gas to decompress, water to be expelled out of the container via the water inlet ports 23, and the AUV to become neutrally buoyant at a recovery position 37. The neutral buoyancy means that AUV can then remain at or near the recovery position 37 with minimal energy expenditure until it is recovered by the surface vessel using the same tube and conveyor system described above for deployment. The neutrally buoyant state of the AUV is a state of unstable equilibrium, and the AUV is kept at its neutrally buoyancy depth by operating its thruster 7 and control surfaces 8 as required.

The bladder 10 acts as a passive buoyancy system rather than an active buoyancy system as in WO2014/096265. The passive buoyancy system does not require a processor, a power source, or a source of compressed air and is thus simpler, cheaper and safer than the active buoyancy system described in WO2014/096265. The valve 22 is closed during operation of the AUV so that the bladder 10 contains a fixed mass of air which does not change during the descent or ascent of the AUV. The AUV remains negatively buoyant as it ascends to the recovery position 37, but this negative buoyancy is opposed by the upward thrust force from the propulsion system.

In the example described above, the AUV employs actuated control surfaces 8 to control the pitch of the AUV. In a first alternative embodiment the AUV may comprise a thrust-vectored propulsion system which is used to control the pitch of the AUV instead of the control surfaces (or in addition to the control surfaces). The thrust-vectored propulsion system generates a thrust force which can be directed parallel with the axis 4 to propel the AUV forwards, or it can be angled up or down relative to the axis 4 to generate a nose-up or nose-down pitching moment. In a second alternative embodiment the propulsion system may comprise an orthogonal set of thrusters including a first thruster (or set of thrusters) aligned parallel with the axis 4 to propel the AUV forwards along the axis 4, and a second thruster (or set of thrusters) aligned at right angles to the axis 4 to propel the AUV up or down. The first thruster is operated to drive the AUV horizontally to a selected target location 34 or recovery location 37, and the second thruster is operated in the powered descent phase 32 to drive the AUV down so that it becomes negatively buoyant and in the ascent phase 35, 36 to detach it from the seabed and then drive it up in opposition to the negative buoyancy force. The orthogonal set of thrusters may be used instead of the control surfaces, or in addition to the control surfaces. The vertically oriented thruster(s) can be operated to direct and upward or downward thrust so that the AUV can continuously hover at its neutrally buoyant recovery location 37 with little or no horizontal movement.

Deploying and recovering the AUV at a depth of 20-30 m avoids the risk of damage to the AUV by surface waves or currents. The sea-level pressure of the bladder 10 is selected so that the AUV is neutrally buoyant at the required depth depending on the deployment and recovery method to be employed. If the deployment and recovery depth changes from survey to survey, then when the AUV is on the surface vessel between surveys, gas can be released from the bladder or introduced into the bladder via the valve 22 to adjust the AUV's neutral buoyancy depth for the next survey. Alternatively the valve 22 may be omitted, and the bladder filled with gas then permanently sealed during manufacture so that the mass of gas in the bladder cannot be adjusted from survey to survey.

The valve 22 is similar to the valve found on a bicycle tyre. That is, the valve 22 acts as a one-way valve during pressurisation of the bladder, opening to admit gas into the bladder and closing to prevent gas from being released from the bladder. If the pressure in the bladder is to be reduced then the valve 22 can be operated to open and vent the gas.

Although the invention has been described above with reference to one or more preferred embodiments, it will be appreciated that various changes or modifications may be made without departing from the scope of the invention as defined in the appended claims.

The invention claimed is:

1. A method of obtaining data with a sensor of an autonomous underwater vehicle (AUV), the AUV comprising a bladder which contains a gas and is exposed to ambient water pressure, the method comprising:
   a. generating a downward thrust force which causes the AUV to descend through a body of water, wherein the bladder contracts as the AUV descends due to an associated increase in the ambient water pressure, the contraction of the bladder causing the gas to compress and the AUV to become negatively buoyant;
   b. landing the AUV on a bed of the body of water;
   c. after the AUV has landed on the bed, operating the sensor to obtain data with the AUV stationary and negatively buoyant and a weight of the AUV supported by the bed; and
   d. after the data has been obtained, generating an upward thrust force which overcomes the negative buoyancy of the AUV and causes the AUV to ascend through the body of water, the ascent of the AUV causing the bladder to expand due to the associated decrease in the ambient water pressure, the expansion of the bladder causing the gas to decompress and the AUV to become neutrally buoyant.

2. The method of claim 1 wherein the AUV has a nose and a tail, and the bladder is positioned closer to the nose than to the tail so that the contraction of the bladder generates a nose-down pitching moment which causes the nose of the AUV to pitch down as it descends.

3. The method of claim 1 wherein the bladder is housed within a container, and the method further comprises:
   admitting water into the container via one or more ports as the AUV descends to expose the bladder to ambient water pressure;
   expelling water from the container via the port(s) as the AUV ascends; and
   constraining the expansion of the bladder with the container.

4. The method of claim 3 wherein the expansion of the bladder is constrained by the container to limit the buoyancy of the AUV.

5. The method of claim 1 wherein the upward thrust force and the downward thrust force are generated by a propulsion system of the AUV.

6. The method of claim 5 wherein the upward thrust force and the downward thrust force are generated by creating a stream of water directed away from the AUV with the propulsion system of the AUV.

7. The method of claim 1 wherein the sensor is a seismic sensor, and step c. comprises operating the seismic sensor to obtain seismic data from the bed of the body of water.

8. The method of claim 1, further comprising:
   e. maintaining a fixed mass of the gas in the bladder which does not change during performance of steps a-d.

9. An autonomous underwater vehicle (AUV) comprising:
   a sensor for obtaining data;
   a propulsion system for generating a thrust force to propel the AUV through the water; and
   a bladder which contains a gas and is exposed to ambient water pressure when the AUV is submerged;
   wherein the bladder is arranged to contract as the AUV descends due to an associated increase in the ambient water pressure, the contraction of the bladder causing the gas to compress and the AUV to become negatively buoyant, and wherein the bladder is arranged to expand as the AUV ascends due to an associated decrease in the ambient water pressure, the expansion of the bladder causing the gas to decompress and the AUV to become neutrally buoyant.

10. The AUV according to claim 9 wherein the sensor is a seismic sensor.

11. The AUV according to claim 9 wherein the gas is at an elevated pressure at sea level which is greater than 150 kPa.

12. The AUV according to claim 9 wherein the gas has a pressure at sea level such that the AUV has a neutral buoyancy at a depth in water which is greater than 5 m.

13. The AUV according to claim 9 wherein the gas has a pressure at sea level such that the AUV has a neutral buoyancy at a depth in water which is less than 50 m.

14. The AUV according to claim 9 wherein the bladder is arranged so that a mass of the gas in the bladder does not change as the bladder contracts and expands during corresponding descent and ascent of the AUV.

15. The AUV according to claim 9 wherein the AUV has a nose and a tail, and the bladder is positioned closer to the nose than to the tail so that the contraction of the bladder generates a nose-down pitching moment which causes the nose of the AUV to pitch down as it descends.

16. The AUV according to claim 9 wherein the bladder is housed within a container which limits a volume of the bladder and has one or more ports which enable(s) water to flow into the container to expose the bladder to ambient water pressure when the AUV is submerged.

17. The AUV according to claim 9 wherein the bladder has a valve which enables the gas to be introduced into the bladder.

18. The AUV according to claim 9 wherein the propulsion system is arranged to generate the thrust force by creating a stream of water directed away from the AUV.

19. The AUV according to claim 9 further comprising a valve which can open to admit gas into the bladder and close to prevent gas from being released from the bladder.

20. The AUV according to claim 9 wherein the AUV does not include a source of compressed gas for filling the bladder.

* * * * *